US008565246B2

(12) United States Patent
Suzuki et al.

(10) Patent No.: US 8,565,246 B2
(45) Date of Patent: Oct. 22, 2013

(54) PACKET RELAY APPARATUS

(75) Inventors: Shinsuke Suzuki, Yokohama (JP); Teruo Kaganoi, Yokohama (JP)

(73) Assignee: ALAXALA Networks Corporation, Kanagawa (JP)

( * ) Notice: Subject to any disclaimer, the term of this patent is extended or adjusted under 35 U.S.C. 154(b) by 290 days.

(21) Appl. No.: 12/969,739

(22) Filed: Dec. 16, 2010

(65) Prior Publication Data
US 2011/0170552 A1 Jul. 14, 2011

(30) Foreign Application Priority Data

Jan. 8, 2010 (JP) ................................. 2010-002597

(51) Int. Cl.
*H04L 12/28* (2006.01)

(52) U.S. Cl.
USPC ............................ 370/401; 370/352; 370/392

(58) Field of Classification Search
USPC .......................................................... 370/401
See application file for complete search history.

(56) References Cited

U.S. PATENT DOCUMENTS

| | | | | |
|---|---|---|---|---|
| 5,404,353 A * | 4/1995 | Ben-Michael et al. | ....... | 370/235 |
| 6,061,351 A * | 5/2000 | Erimli et al. | ................... | 370/390 |
| 6,233,224 B1 * | 5/2001 | Yamashita et al. | ............ | 370/231 |
| 6,577,636 B1 * | 6/2003 | Sang et al. | ................. | 370/395.7 |
| 6,731,613 B1 * | 5/2004 | Provance | ...................... | 370/311 |
| 6,738,371 B1 * | 5/2004 | Ayres | ............................. | 370/352 |
| 6,958,978 B1 * | 10/2005 | Ireland et al. | .................. | 370/252 |
| 7,382,788 B2 * | 6/2008 | Furey et al. | .................... | 370/401 |
| 7,653,072 B2 * | 1/2010 | Deforche et al. | ............. | 370/401 |
| 7,773,530 B2 * | 8/2010 | Varier et al. | .................... | 370/241 |
| 7,990,980 B2 * | 8/2011 | Glazberg et al. | ........... | 370/395.4 |
| 2006/0114831 A1 * | 6/2006 | Buduma et al. | ............... | 370/241 |
| 2006/0176880 A1 * | 8/2006 | Bare et al. | ..................... | 370/392 |

OTHER PUBLICATIONS

K. Ramakrishnan et al., The Addition of Explicit Congestion Notification (ECN) to IP, Network Working Group, RFC 3168, Sep. 2001, pp. 1-62.

P. Eardley, et al., Pre-Congestion Notification (PCN) Architecture, Network Working Group, RFC 5559, Jun. 2009, pp. 1-54.

* cited by examiner

*Primary Examiner* — Ian N Moore
*Assistant Examiner* — Lakeram Jangbahadur
(74) *Attorney, Agent, or Firm* — Antonelli, Terry, Stout & Kraus, LLP.

(57) ABSTRACT

When burst traffic causes a packet to overflow or to be ready to overflow from a queue, a packet relay apparatus mirrors only the packets to be accumulated in that queue. An outgoing queue management unit copies a packet into a queue in an outgoing queue list and then obtains the length of the queue (step 272). If the queue length is greater than a mirroring starting threshold, the value of the mirroring on/off flag in the corresponding queue entry is changed to ON (step 275). If the queue length is smaller than a mirroring stopping threshold, the value of the flag is changed to OFF (step 274). After the queue length exceeds the mirroring starting threshold until the queue length becomes smaller than the mirroring stopping threshold, only the packets to be output to that queue are mirrored.

16 Claims, 13 Drawing Sheets

| | 130 | 131 | 132 | 133 | |
|---|---|---|---|

| Destination | Outgoing Interface | Outgoing Queue |
|---|---|---|
| Node1 | Interface1 | Q8 |
| Node2 | Interface2 | Q4 |

FIG. 4A

| Outgoing Interface | Outgoing Queue | Mirroring Destination | ON/OFF |
|---|---|---|---|
| Interface1 | Q8 | Interface3 Q1 | OFF |
| ... | ... | ... | ... |

FIG. 4B

| Outgoing Interface | Outgoing Queue | Mirroring Destination | ON/ OFF | Starting Threshold | Stopping Threshold | Last Update |
|---|---|---|---|---|---|---|
| Interface1 | Q8 | Interface3 Q1 | OFF | | | |
| ... | ... | ... | ... | | | |

| Destination | Outgoing Interface | Action |
|---|---|---|
| Node1 | Interface3 | Permit |
| Any | Interface3 | Deny |

| Outgoing Interface | Outgoing Queue | Mirroring Destination | ON/ OFF | Interval | Skipped Packet |
|---|---|---|---|---|---|
| Interface1 | Q8 | Interface3 Q1 | OFF | 20 | 18 |
| Interface2 | Q8 | Interface3 Q1 | ON | 1 | 1 |
|  |  |  |  |  |  |

FIG. 12

| Outgoing Queue | Copy ON/OFF |
|---|---|
| Q8 | OFF |
| ... | ... |

160, 161, 162

FIG. 13

PACKET RELAY APPARATUS

CLAIM OF PRIORITY

The present application claims priority from Japanese patent application JP 2010-002597 filed on Jan. 8, 2010, the content of which is hereby incorporated by reference into this application.

BACKGROUND OF THE INVENTION

1. Field of the Invention

The present invention relates to packet relay apparatuses, and more specifically, to a packet relay apparatus that is used in a network, such as the Internet, to monitor and prevent or to monitor or prevent packet loss caused by traffic such as burst traffic.

2. Description of the Related Art

Generally, the flow of traffic exchanged among servers and terminals is not always constant and may jump instantaneously at the beginning of traffic flow (burst) or the like.

If a packet relay apparatus receives such burst traffic and if the bandwidth of the burst traffic is greater than the bandwidth of the output interface, packets are accumulated in an outgoing queue during the burst and are outputted from the queue after the burst ends, so that no packets will be lost. If the packet relay apparatus reaches its maximum relaying capability, the same step is taken in an incoming queue, so that no packets will be lost.

As the performance of servers and terminals has been improved in these days, the traffic flow of such a burst has been increasing. If the traffic flow of a burst is too large, the packets could not be accumulated in the queue of the packet relay apparatus, and some packets might be lost.

The packet loss even in an instant could degrade the reliability (UDP traffic or the like that can be affected by packet loss) or throughput (TCP traffic or the like that can be affected by packet loss) and should be avoided. It would not be appropriate, however, to lengthen the queue of the packet relay apparatus. A long queue would increase the cost of the packet relay apparatus or would retain the packets too long and overextend the delay.

To solve the packet loss problem caused by such a burst, a number of technologies for suppressing a burst by cooperation between the apparatuses or between the apparatus and the terminal have been developed. The technologies include Explicit Congestion Notification (non-patent literature 1), Backward Congestion Notification (non-patent literature 2), Priority-based Flow Control (non-patent literature 3), and Pre-Congestion Notification (non-patent literature 4). When a burst seems to cause a queue to overflow at any moment in a packet relay apparatus, those technologies give that information to the preceding packet relay apparatus or terminal to let it suppress the burst.

[non-patent literature 1] IETF, "The Addition of Explicit Congestion Notification (ECN) to IP", RFC3168.

[non-patent literature 2] IEEE, "IEEE Standard for Local and Metropolitan Area Networks - - - Virtual Bridged Local Area Networks—Amendment: 10: Congestion Notification", IEEE802.1Qau

[non-patent literature 3] IEEE, "IEEE Standard for Local and Metropolitan Area Networks - - - Virtual Bridged Local Area Networks—Amendment: Priority-based Flow Control", IEEE802.1Qbb

[non-patent literature 4] IETF, "Pre-Congestion Notification (PCN) Architecture", RFC5559

SUMMARY OF THE INVENTION

As a prerequisite of the related technologies, all the terminals or packet relay apparatuses in a network support given technologies. In actual networks, however, the prerequisite is not practical. Usually, in actual operation, packets are always mirrored (duplicated or copied) in a physical channel that seems to cause a queue overflow in the packet relay apparatus, and traffic that could cause a queue overflow is monitored.

The greatest problem of that type of operation is that it takes a lot of time to analyze the vast amount of mirrored packets. Even if there is an apparatus that can analyze a burst efficiently, the correlation between a burst and queue overflow cannot be known, and the cause of the queue overflow cannot be found in many cases.

Accordingly, it is an object of the present invention to provide a packet relay apparatus that monitors and prevents or monitors or prevents packet loss caused by traffic such as burst traffic.

According to the present invention, when burst traffic causes or seems to cause a packet to overflow from a queue in a packet relay apparatus, just the packets accumulated in that queue are mirrored.

The packet relay apparatus according to the present invention can judge whether packet mirroring is necessary in accordance with the interface to or from which the packet is input or output, the value of a field in the packet, or the amount of usage of a buffer where the packet has passed.

A burst traffic monitoring method according to the present invention can mirror and monitor just burst traffic that is going to cause overflow from a buffer, by determining whether a packet that passes the buffer is mirrored or not in accordance with the amount of usage of the packet buffer.

A system according to the present invention includes a packet relay apparatus that can determine whether packet mirroring is necessary by considering the buffer where the packet has passed among others, and an external server which monitors the amount of usage of the packet buffer by the packet relay apparatus, and the system can mirror and monitor burst traffic that is going to cause overflow from the buffer by using the external server to monitor the amount of usage of the packet buffer and determining whether the packet passing through the buffer is mirrored in accordance with the amount of usage.

According to the present invention, whether to mirror a packet can also be determined by comparing the amount of usage of the packet buffer with a threshold.

The packet can be copied by packet mirroring.

The packet relay apparatus according to the present invention can use a part of the packet buffer as a dummy buffer that is not used to input or output a packet to implement packet mirroring by copying the packet to the dummy buffer.

According to the present invention, by setting a mirroring starting threshold greater than a mirroring stopping threshold, unstable burst traffic monitoring can be avoided even if the amount of usage of the buffer is unstable around the thresholds.

In the present invention, a buffer which is ready to overflow can be monitored efficiently in burst traffic monitoring, by decreasing the thresholds related to the buffer each time packet mirroring starts newly and by increasing the thresholds related to the buffer if packet mirroring does not start for a predetermined period of time after packet mirroring ends.

In the present invention, when a buffer starts packet mirroring newly, burst traffic monitoring can automatically monitor a buffer that is probable to overflow, by decreasing the thresholds related to a buffer that is less likely to output, because of the output scheduling among the buffers.

According to the present invention, traffic causing a burst can be narrowed by filtering the mirrored packets appropriately in the packet relay apparatus.

If the packet relay apparatus has a function to change intervals of packet mirroring, the mirroring intervals can be changed in accordance with the amount of usage of the buffer, in the present invention.

If a dummy buffer is used in the present invention, by copying just the header of the packet to the dummy buffer, more flow information of burst traffic can be taken while the dummy buffer can be saved.

In that case, when the packet is copied into the dummy buffer, more accurate states of the burst traffic in the apparatus can be obtained by adding information that is related to transfer within the apparatus and that is not included in the packet.

A system according to the present invention can efficiently identify traffic causing a burst by using a packet relay apparatus that has the functions described above or a packet relay apparatus that can determine whether packet mirroring is necessary by considering the buffer where a packet has passed among others, and an external traffic analyzer that analyzes the burst packet obtained by one of the methods described above.

According to the first solving means of the present invention, there is provided that a packet relay apparatus comprising:

a packet transfer processing unit that manages packet transfer processing;

an outgoing queue list for each interface, the list having a plurality of queues, selecting a queue from the plurality of queues, and outputting a packet from the queue to an interface;

an outgoing queue management unit that controls the outgoing queue list;

a route table that stores an outgoing interface and an outgoing queue corresponding to a destination; and a mirroring management table that stores a mirroring destination interface and a mirroring flag corresponding to the outgoing interface and outgoing queue;

the packet transfer processing unit comparing the destination of a received packet with a destination in the route table and obtaining the outgoing interface and the outgoing queue of an entry where the destinations match as the outgoing interface and the outgoing queue of the packet;

the packet transfer processing unit comparing the obtained outgoing interface and outgoing queue, in the mirroring management table;

if the mirroring flag of an entry where the outgoing interface and outgoing queue match is ON, the packet transfer processing unit instructing the outgoing queue management unit to copy the packet to the destination interface in the entry, and the outgoing queue management unit outputting the packet to the queue in the outgoing queue list, corresponding to the outgoing interface, and outputting a copied packet to the queue in the outgoing queue list, corresponding to the mirroring destination interface;

if the mirroring flag of the corresponding entry is OFF, the packet transfer processing unit instructing the outgoing queue management unit to output the packet, and the outgoing queue management unit outputting the packet to the queue in the outgoing queue list, corresponding to the outgoing interface;

the outgoing queue management unit obtaining the length of the queue from which the packet is output, if the queue length is greater than a predetermined mirroring starting threshold, changing the mirroring flag in the corresponding entry of the mirroring management table to ON, or, if the queue length is smaller than a predetermined mirroring stopping threshold, changing the flag to OFF; and the outgoing queue list selecting the queue from the plurality of queues and outputting the packet to the corresponding interface.

According to the second solving means of the present invention, there is provided that a packet relay apparatus comprising:

a packet transfer processing unit that manages packet transfer processing;

an outgoing queue list for each interface, the list having a plurality of queues, selecting an appropriate queue from the plurality of queues, and outputting a packet from the queue to an interface; and a route table that stores an outgoing interface and an outgoing queue corresponding to a destination;

the outgoing queue list further comprising:

a mirroring management table that stores a mirroring flag corresponding to the outgoing queue;

a dummy queue that is not used to output a packet; and an outgoing queue management unit that outputs the packet received from the packet transfer processing unit to either the plurality of queues or the dummy queue;

the packet transfer processing unit comparing the destination of the received packet with a destination in the route table, determining the outgoing queue list of the packet from the destination interface of an entry where the destinations match, and instructing the outgoing queue list to output the packet to the outgoing queue of the entry;

the outgoing queue management unit of the instructed outgoing queue list comparing the outgoing queue, in the mirroring management table, if the mirroring flag of an entry where the outgoing queue matches is OFF, outputting the packet to the outgoing queue of the determined outgoing interface, and if the flag is ON, outputting the packet to the dummy queue in the outgoing queue list of the determined outgoing interface, in addition to the outgoing queue;

the outgoing queue management unit obtaining the length of the queue from which the packet is output, if the queue length is greater than a predetermined mirroring starting threshold, changing the mirroring flag in the corresponding queue entry of the mirroring management table to ON, and if the queue length is smaller than a predetermined mirroring stopping threshold, changing the flag to OFF; and the outgoing queue list selecting the queue from the plurality of queues and outputting the packet to the corresponding interface.

Advantages of the Invention

The present invention can provide a packet relay apparatus that can monitor and prevent or monitor or prevent packet loss caused by traffic such as burst traffic.

Since the technology according to the present invention is applied to a single packet relay apparatus, it is easier to introduce the technology into a network than the conventional technologies. Because just a packet that has overflowed or is going to overflow from a queue is mirrored, the amount of traffic to be analyzed is not so great as the traffic to be analyzed in simple mirroring. The relationship between the mirrored packet and queue overflow is self-explanatory.

BRIEF DESCRIPTION OF THE DRAWINGS

FIGS. 4A and 4B show a route table and the mirroring management table illustrated in FIG. 3A.

FIG. 10 is a view showing a mirroring management table in a fifth embodiment.

FIG. 11 is a view showing a filtering database in a second embodiment.

FIG. 12 is a view showing a mirroring management table in a third embodiment.

FIG. 13 is a view showing a queuing management table.

DESCRIPTION OF THE PREFERRED EMBODIMENTS

1. Packet Relay Apparatus (1)
1-1. First Embodiment

Figure 2:
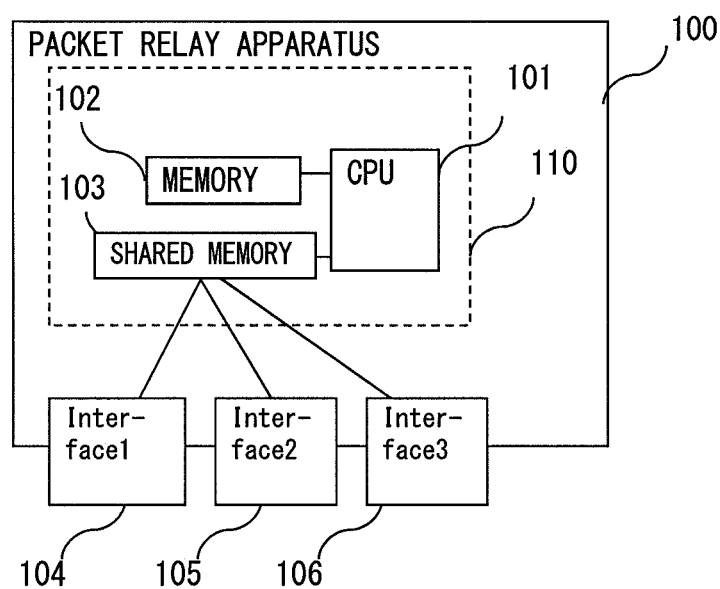
FIG. 2 is a view showing the hardware structure of a packet relay apparatus in a first embodiment.

FIG. 2 shows a physical configuration diagram of a packet relay apparatus 100 in a first embodiment.

The packet relay apparatus 100 includes a packet relay program 110 and interfaces 104, 105, and 106. The packet relay program 110 includes a CPU 101, a memory 102, and a shared memory 103. The packet relay apparatus 100 stores a packet that comes from the interface 104, 105, or 106 in the shared memory 103, lets the packet relay program 110 operating on the CPU 101 or the memory 102 process the packet in the shared memory 103, and outputs the result to an appropriate interface.

Figure 3A:
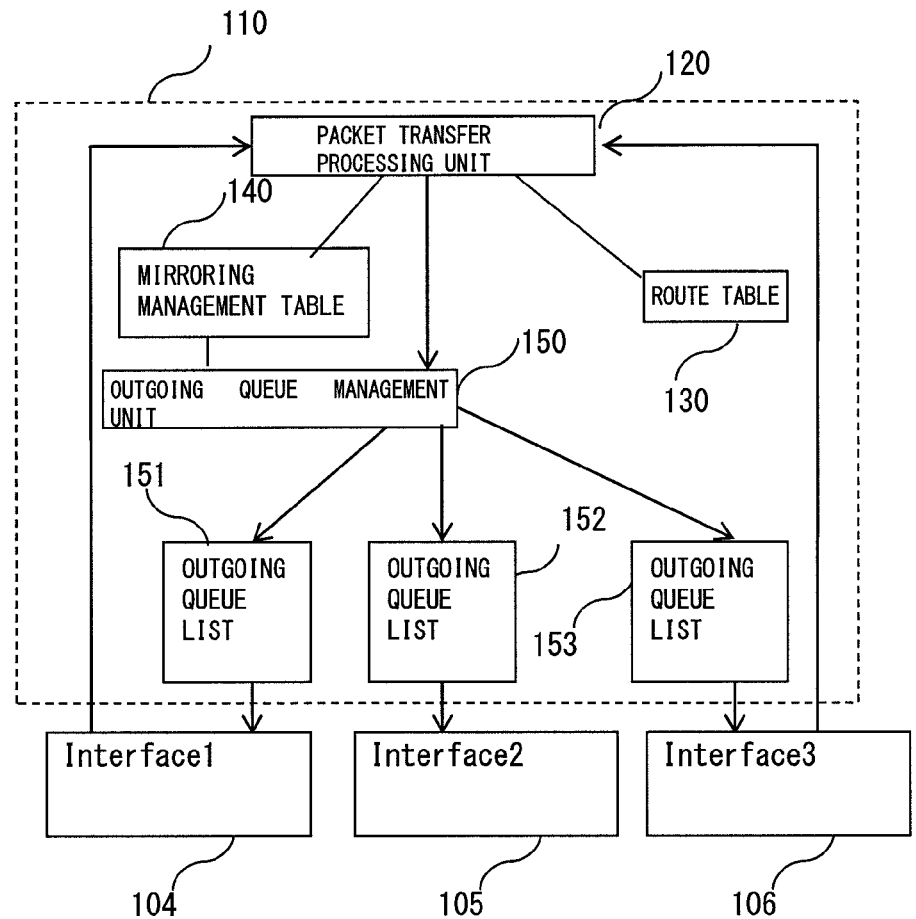
FIGS. 3A and 3B show the software configuration of the apparatus shown in FIG. 2.
Figure 3B:
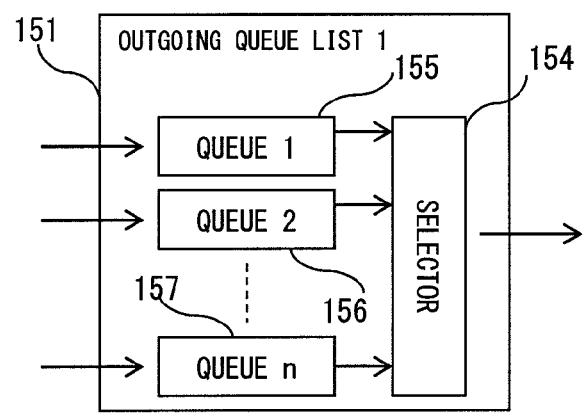

FIG. 3A is a view showing the logical configuration of the packet relay program 110. FIG. 3B is a configuration diagram of an outgoing queue list.

The packet relay program 110 includes a packet transfer processing unit 120 that manages packet transfer processing, a route table 130, a mirroring management table 140, an outgoing queue list 151 of each interface for outputting packets to the interface, and an outgoing queue management unit 150 that controls the outgoing queue list. The outgoing queue list 151 includes a plurality of queues 155, 156, and 157. The interface 104 corresponding to the outgoing queue list 151 selects an appropriate queue via a selector 154 in the outgoing queue list 151 and outputs the packets from the queue. The selector 154 can have many queue selection rules such as a descending order of queue number and a round-robin, which are beyond the scope of the present invention, and an appropriate one can be adopted.

The packet transfer processing unit 120 is connected to the route table 130 for determining a destination and to the mirroring management table 140 for determining whether mirroring is necessary.

FIG. 4A shows the structure of the route table 130, and FIG. 4B shows the structure of the mirroring management table 140.

The route table 130 is a table for managing the outgoing interface 132 and the outgoing queue 133 corresponding to a destination 131. The mirroring management table 140 includes the mirroring destination interface and queue 143 and the mirroring on/off flag 144 corresponding to an outgoing interface 141 and an outgoing queue 142.

The operation of the packet relay apparatus 100 will be described next.

Figure 5:
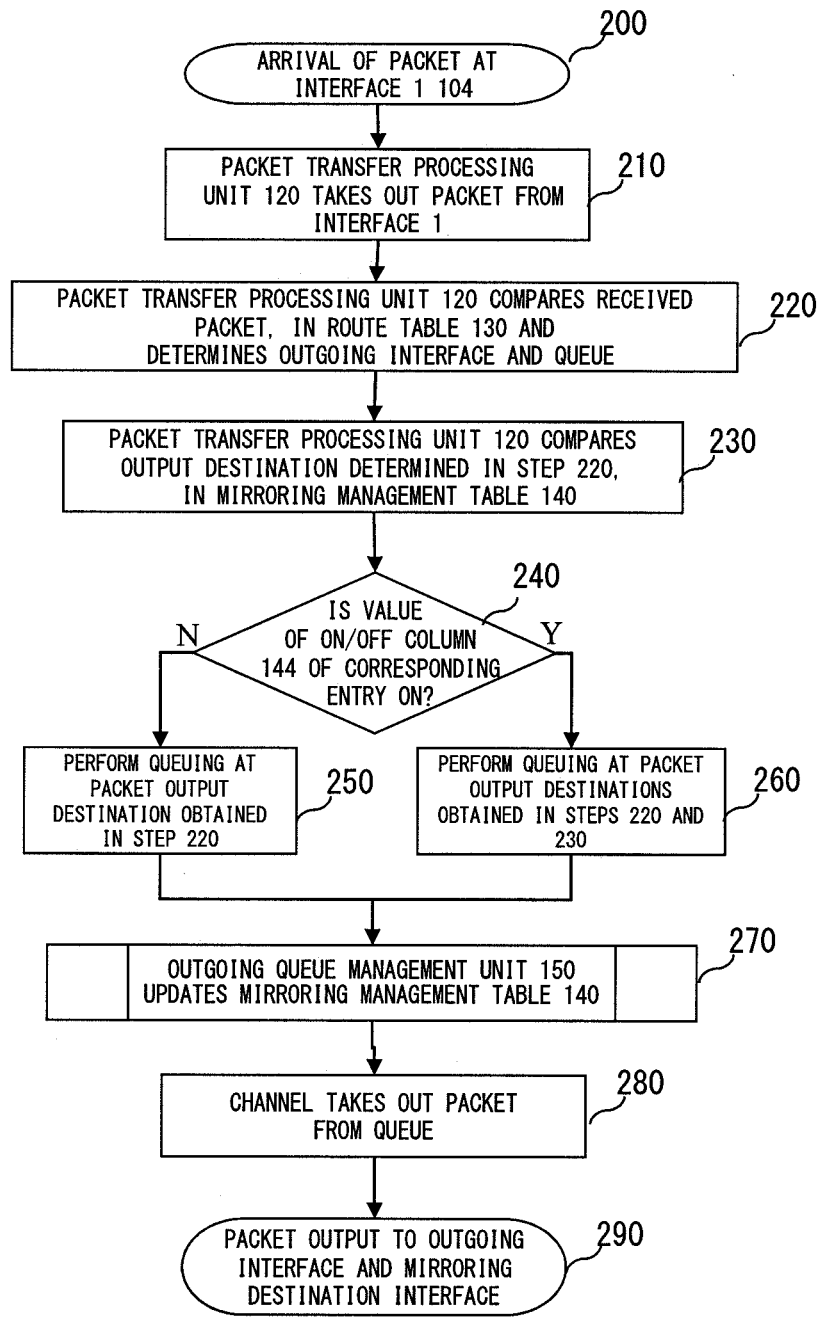
FIG. 5 is a flowchart illustrating a procedure for relaying packets in the apparatus shown in FIG. 2.

FIG. 5 is a flowchart illustrating how the packet relay program 110 works to relay a packet.

When a packet comes from a interface, the packet transfer processing unit 120 takes out (picks up, fetches, retrieves etc.) the packet from the interface (step 210). The packet transfer processing unit 120 then compares the destination of the packet with the destination 131 in the route table 130 and determines the outgoing interface (outgoing port) 132 and outgoing queue (outgoing queue number) 133 in the corresponding entry as the outgoing interface and outgoing queue of the packet (step 220). The packet transfer processing unit 120 also compares the outgoing interface 132 and outgoing queue 133 determined in step 220, in the mirroring management table 140. If the mirroring on/off flag 144 of the entry where the outgoing interface 132 and outgoing queue 133 match the outgoing interface 141 and outgoing queue 142 is ON, mirroring to the corresponding mirroring destination interface and queue 143 will be conducted (steps 230 and 240).

The packet transfer processing unit 120 gives the obtained result to the outgoing queue management unit 150 to output the packet from the corresponding queue. The outgoing queue management unit 150 copies the packet into the queue in the outgoing queue list corresponding to the interface, determined as described above (steps 250 and 260). Specifically, if it is determined in step 240 that the value of the mirroring on/off flag 144 is OFF, the packet is output to the outgoing interface and outgoing queue obtained in step 220 (step 250). If it is determined in step 240 that the value of the mirroring on/off flag 144 is ON, the packet is output to the outgoing interface and outgoing queue obtained in step 220, and a copied (mirrored) packet is also output to the mirroring destination interface and queue obtained in step 230 (step 260). The outgoing queue management unit 150 updates the mirroring management table 140 (step 270), as described later. The outgoing queue list 151, 152, or 153 selects an appropriate queue by using the selector 154, and the corresponding interface 104, 105, or 106 takes out the packet from the queue to output the packet (steps 280 and 290).

Figure 1:
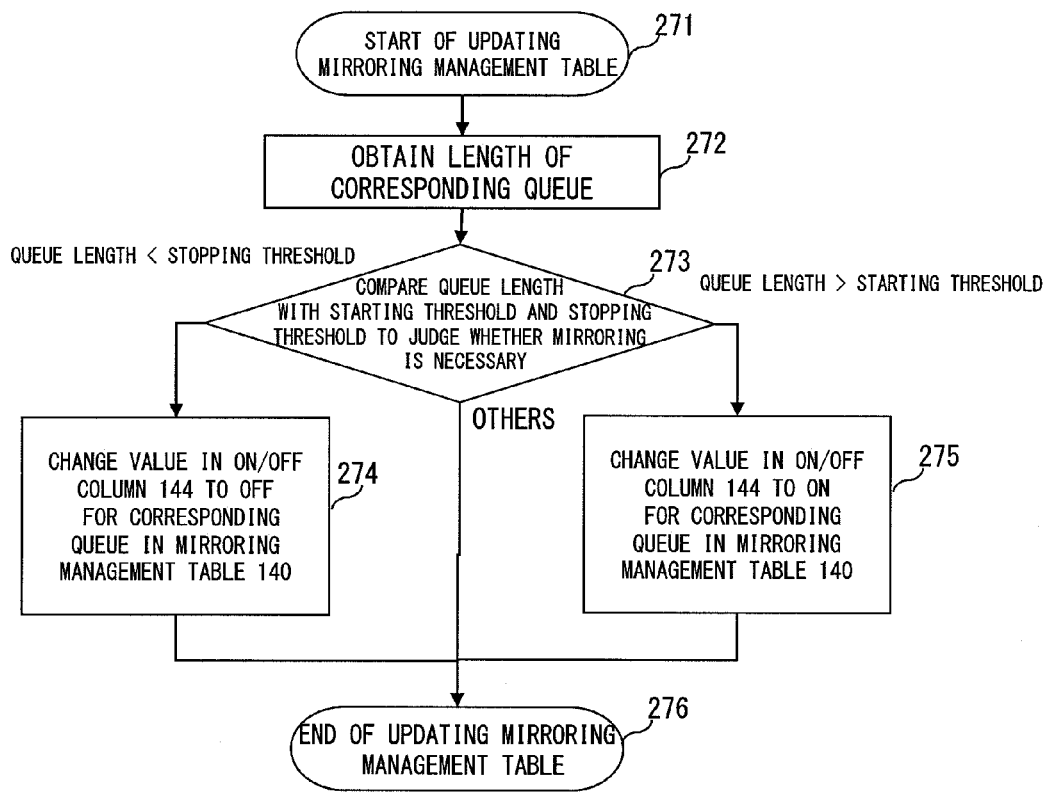
FIG. 1 is a flowchart illustrating a procedure for updating a mirroring management table.

FIG. 1 is a flowchart illustrating a procedure for updating the mirroring management table 140. Updating of the mirroring management table 140 in step 270 will be described with reference to FIG. 1.

The outgoing queue management unit 150 copies the packet into the queue in the outgoing queue list in step 250 or 260, and then determines and obtains the length of the queue (step 272). The queue length is determined by counting the number of packets accumulated in the queue or by counting the number of bytes in a buffer, used by the queue, for example. Any other counting methods can be used in the present invention.

To judge whether mirroring is necessary, the outgoing queue management unit 150 compares the queue length with a mirroring starting threshold and a mirroring stopping threshold (step 273). The mirroring starting threshold and the mirroring stopping threshold can be stored in an internal or external memory of the outgoing queue management unit 150 beforehand, for example, and the outgoing queue management unit 150 can be configured to reference the values. The mirroring starting threshold should have a greater value than the mirroring stopping threshold. This prevents mirroring from becoming unstable if the queue length is unstable with respect to the thresholds.

If the queue length is greater than the mirroring starting threshold, the outgoing queue management unit 150 changes the value of the mirroring on/off flag 144 in the corresponding entry of the mirroring management table 140 to ON (step 275). If the queue length is smaller than the mirroring stopping threshold, the outgoing queue management unit 150 changes the value of the flag to OFF (step 274). Otherwise (the queue length is equal to or smaller than the mirroring starting threshold and equal to or greater than the mirroring stopping threshold) in step 273, the outgoing queue management unit 150 goes to step 276 without changing any value in the mirroring management table 140.

By the operation described above, only the packets output to the corresponding queue are mirrored after the queue length exceeds the mirroring starting threshold until the queue length becomes smaller than the mirroring stopping threshold. In traffic analysis using such mirroring, an external traffic analyzer has to analyze just packets that are almost overflowing from the queue, so that it becomes easier to monitor burst traffic.

The packet relay apparatus provided by software has been described in this embodiment. This does not deny any equivalent invention of a hardware packet relay apparatus.

The outgoing queue management unit 150 checks the overflow of the outgoing queue in this embodiment and can also check the overflow of an incoming queue or a Policer buffer in the same manner. To be more specific, a part that manages the amount of usage of the incoming queue or Policer buffer in the packet relay apparatus 100 should execute the same queue length monitoring operation as performed by the outgoing queue management unit 150 in this embodiment.

1-2. Second Embodiment

A second embodiment differs from the first embodiment in that the packet transfer processing unit 120 can filter the mirrored packets in accordance with a predetermined rule.

A packet relay procedure in the second embodiment includes steps described below in addition to the packet relay procedure (FIG. 5) of the first embodiment.

FIG. 11 is a view showing a filtering database 180 in the second embodiment.

The packet transfer processing unit 120 compares the destination and mirroring designation of an outgoing packet with a destination 181 and an outgoing interface 182 in the filtering database 180 shown in FIG. 11, between steps 240 and 260. Here, instead of the destination and outgoing interface of the packet, a different field in the packet header may be used. If the value in an action column 183 in the entry where the above items match is "permit", the packet transfer processing unit 120 goes to step 260 to perform mirroring. If the value in the action column 183 is "deny" or if there is no entry where the above items match, the packet transfer processing unit 120 goes to step 250 and does not perform mirroring.

Accordingly, the packets to be analyzed that are mirrored in the procedure in the first embodiment can be narrowed in accordance with the filtering database, and the analysis can be facilitated further.

The filtering database 180 of this embodiment can be a stateful inspection that examines the contents of past sessions carefully and a firewall that examines details of packets carefully, as well as a packet filter as shown in FIG. 1.

1-3. Third Embodiment

FIG. 12 is a view showing a mirroring management table 140 in a third embodiment.

The third embodiment differs from the first embodiment in that the packet relay apparatus has a function to perform packet mirroring at constant intervals. Unlike the table in the first embodiment, the mirroring management table 140 has the interval column 148 and the skipped packet column 149, as shown in FIG. 12.

A packet relay procedure in this embodiment includes the following steps in addition to the packet relay procedure (FIG. 5) in the first embodiment.

Immediately before mirroring (between steps 240 and 260), the packet transfer processing unit 120 increments by one the value of the skipped packet column 149 in the corresponding entry of the mirroring management table 140. If the resultant value in the skipped packet column 149 is greater than or equal to the value in the interval column 148, the packet transfer processing unit 120 resets the value of the skipped packet column 149 to zero and goes to step 260 to perform mirroring. While the value of the skipped packet column 149 is smaller than the value in the interval column 148, the packet transfer processing unit 120 goes to step 250 and does not perform mirroring. Consequently, mirroring is performed only once for the number of packets specified in the interval column 148.

In the packet relay apparatus having the function described above, the procedure for updating the mirroring management table 140 includes the following steps in addition to the procedure for updating the mirroring management table (FIG. 1) in the first embodiment.

If it is determined in step 273 that the queue length is not smaller than the stopping threshold (step 274), the outgoing queue management unit 150 updates the interval column 148 in addition to the mirroring on/off flag 144. The new value in the interval column 148 is calculated in accordance with the queue length obtained in step 272, the mirroring starting threshold, and the mirroring stopping threshold. For example, if the calculation obtains the difference between N divided by the queue length and the mirroring starting threshold (N is a constant, and the queue length is greater than the mirroring starting threshold), the frequency of mirroring can be increased in inverse proportion to the difference between the queue length and the mirroring starting threshold.

By defining the calculation appropriately, mirroring can be performed frequently immediately before the queue overflows or frequently in proportion to the queue length.

1-4. Fourth Embodiment

Figure 9:
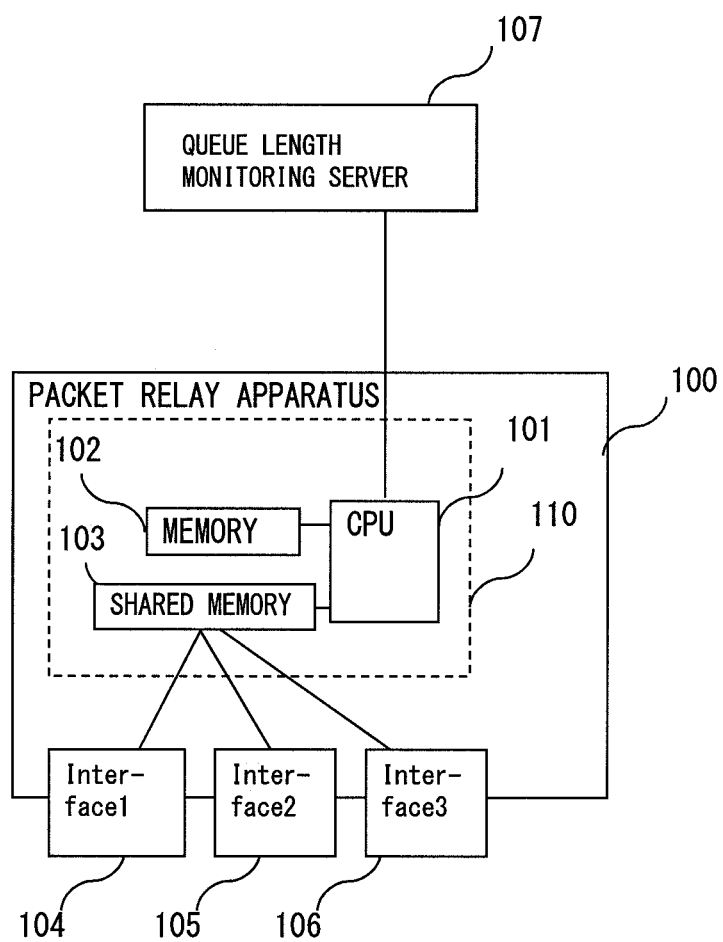
FIG. 9 is a configuration diagram showing a packet relay apparatus and a queue length monitoring server in a fourth embodiment.

FIG. 9 is a diagram showing a packet relay apparatus 100 and an external queue length monitoring server 107 in a fourth embodiment.

In the fourth embodiment, the external queue length monitoring server 107 and the packet relay apparatus 100 are combined as shown in FIG. 9. The queue length monitoring server 107 is an external server having the output queue length monitor function and the function to issue a mirroring start instruction, separated from the outgoing queue management unit 150 in the first embodiment.

The queue length monitoring server 107 checks periodically each output queue length of the packet relay apparatus with the outgoing queue management unit 150. If it finds that the queue length has reached a threshold, in the same procedure as that shown in FIG. 1, the queue length monitoring server 107 instructs the packet relay apparatus to update the mirroring management table 140.

Alternatively, the queue length monitoring server 107 may monitor the queue lengths in the outgoing queue lists 151, 152, and 153 and may determine whether a packet is mirrored in accordance with the queue lengths.

By using the queue length monitoring server 107 as described above, even a packet relay apparatus in which the queue length monitoring function and the mirroring function do not work together can produce effects equivalent to the those produced by the first embodiment.

1-5. Fifth Embodiment

A fifth embodiment differs from the first embodiment in that mirroring is determined in accordance with a detailed rule.

FIG. 10 is a view showing a mirroring management table 140 in the fifth embodiment.

In the fifth embodiment, the mirroring management table used in the first embodiment is changed to that shown in FIG. 10. The mirroring starting threshold and mirroring stopping threshold are shared in the whole of the apparatus in the first embodiment. In this embodiment, the values (columns 145 and 146) are specified for a single queue. A last updated column 147 is not used and can be omitted in this embodiment.

As in the first embodiment, the packet transfer processing unit 120 and the outgoing queue management unit 150 in the fifth embodiment perform packet relay operation (steps 230 to 270 in FIG. 5, for example) by using the mirroring management table 140 and update the mirroring management table 140 (steps 273 to 275 in FIG. 1, for example). The thresholds referenced to determine whether to start or stop mirroring are not fixed values but are given in the columns 145 and 146.

A queue that is likely to overflow can be monitored closely by specifying a low threshold.

1-6. Sixth Embodiment

A sixth embodiment differs from the first embodiment in that the output selector 154 in the outgoing queue list 151 can determine in step 280 of the packet relay procedure from which queue of any two queues packets are likely to be output in accordance with the characteristics of the scheduling algorithm for selecting a queue for outputting packets.

A procedure for updating the mirroring management table 140 in this embodiment differs from that shown in FIG. 1, as described below.

After starting mirroring by changing the value of the mirroring on/off flag 144 for an outgoing queue to ON in step 275, the outgoing queue management unit 150 starts mirroring for another queue that is less likely to output packets by changing the value of the corresponding mirroring on/off flag 144 to ON. The outgoing queue management unit 150 can determine the unlikelihood of output in accordance with the value of the queue number (priority queuing), the weight indicating the scheduling priority of each queue (weighted fair queuing), the queue length (queue-length-based queuing), or the like.

After stopping mirroring by changing the value of the mirroring on/off flag 144 of an outgoing queue to OFF in step 274, the outgoing queue management unit 150 performs steps 272, 273, 274, and 275 with respect to a queue that is less likely to output packets and updates the mirroring on/off flag 144. If even a single queue remains with ON in the mirroring on/off flag 144, the value of the mirroring on/off flag 144 is changed to ON for a queue that is less likely to output packets.

By changing the threshold in accordance with the scheduling in the outgoing queue list, a sign of queue overflow can be detected earlier.

1-7. Seventh Embodiment

A seventh embodiment differs from the fifth embodiment in that the past history of queue overflow is taken into consideration.

In the seventh embodiment, the start or end time of the most recent mirroring is managed in the last update column 147 in the mirroring management table 140 (FIG. 10).

A procedure for relaying packets and a procedure for updating the mirroring management table differ from the corresponding procedures in the fifth embodiment as described below.

For example, each time mirroring starts in step 275, the outgoing queue management unit 150 lowers the thresholds in the columns 145 and 146 and records the mirroring start time in the last update column 147. Each time mirroring ends in step 274, the mirroring end time is recorded in the last update column 147.

The outgoing queue management unit 150 checks periodically the last update columns 147 of all the entries in the mirroring management table 140 and raises the thresholds in the columns 145 and 146 for any entry where the start of mirroring is not recorded for a predetermined period.

Accordingly, monitoring depending on the likelihood of queue overflow can be performed automatically.

2. Packet Relay Apparatus (2)

2-1. Eighth Embodiment

Figure 6A:
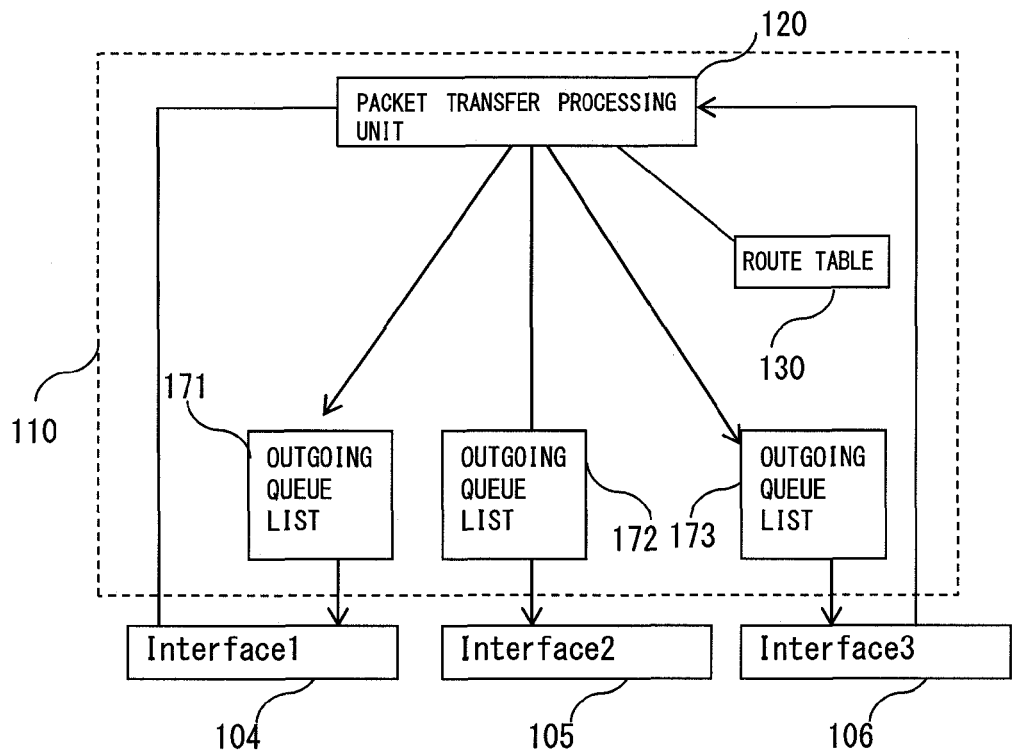
FIGS. 6A and 6B are configuration diagrams showing a packet relay apparatus in an eighth embodiment.
Figure 6B:
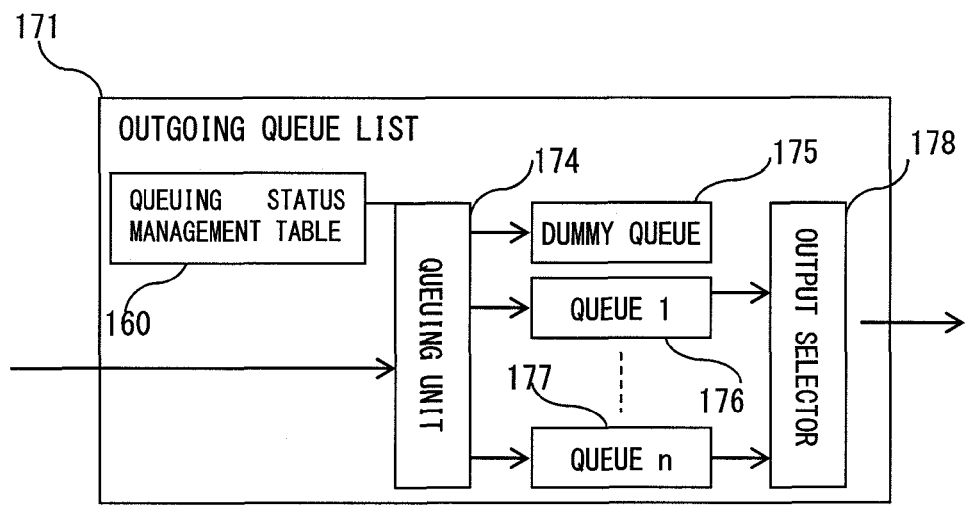

FIGS. 6A and 6B are configuration diagrams showing a packet relay apparatus 100 in an eighth embodiment.

The packet relay apparatus 100 in the eighth embodiment has the same physical structure as the packet relay apparatus 100 shown in FIG. 2 and has the logical configuration shown in FIGS. 6A and 6B. FIG. 6A shows the logical configuration of a packet relay program 110. FIG. 6B is the configuration diagram of an outgoing queue list. The packet relay program 110 shown in FIG. 6A will be described next.

In the eighth embodiment, the structure differs from that shown in FIG. 2 in the that the packet transfer processing unit 120 does not contain the mirroring management table 140 or the outgoing queue management unit 150; and an outgoing queue list 171 for each interface contains a queuing status management table (mirroring management table) 160 and a queuing unit (outgoing queue management unit) 174.

FIG. 13 is a view showing the queuing status management table 160.

The queuing status management table 160 in the outgoing queue list 171 manages the copy on/off flag 162 corresponding to an outgoing queue 161.

The structure of a route table 130 is the same as that shown in FIG. 4A.

The outgoing queue list 171 includes a dummy queue 175 that is not used to output packets, in addition to outgoing queues 176 and 177 which are the same as those shown in FIG. 3B. The outgoing queue list 171 includes a queuing unit 174 for accumulating a packet received from the packet transfer processing unit 120 in an appropriate queue (175, 176, or 177) and an output selector 178 for outputting packets from a queue (176 or 177) other than the dummy queue to an interface.

The operation of the packet relay apparatus 100 will be described next.

Figure 7:
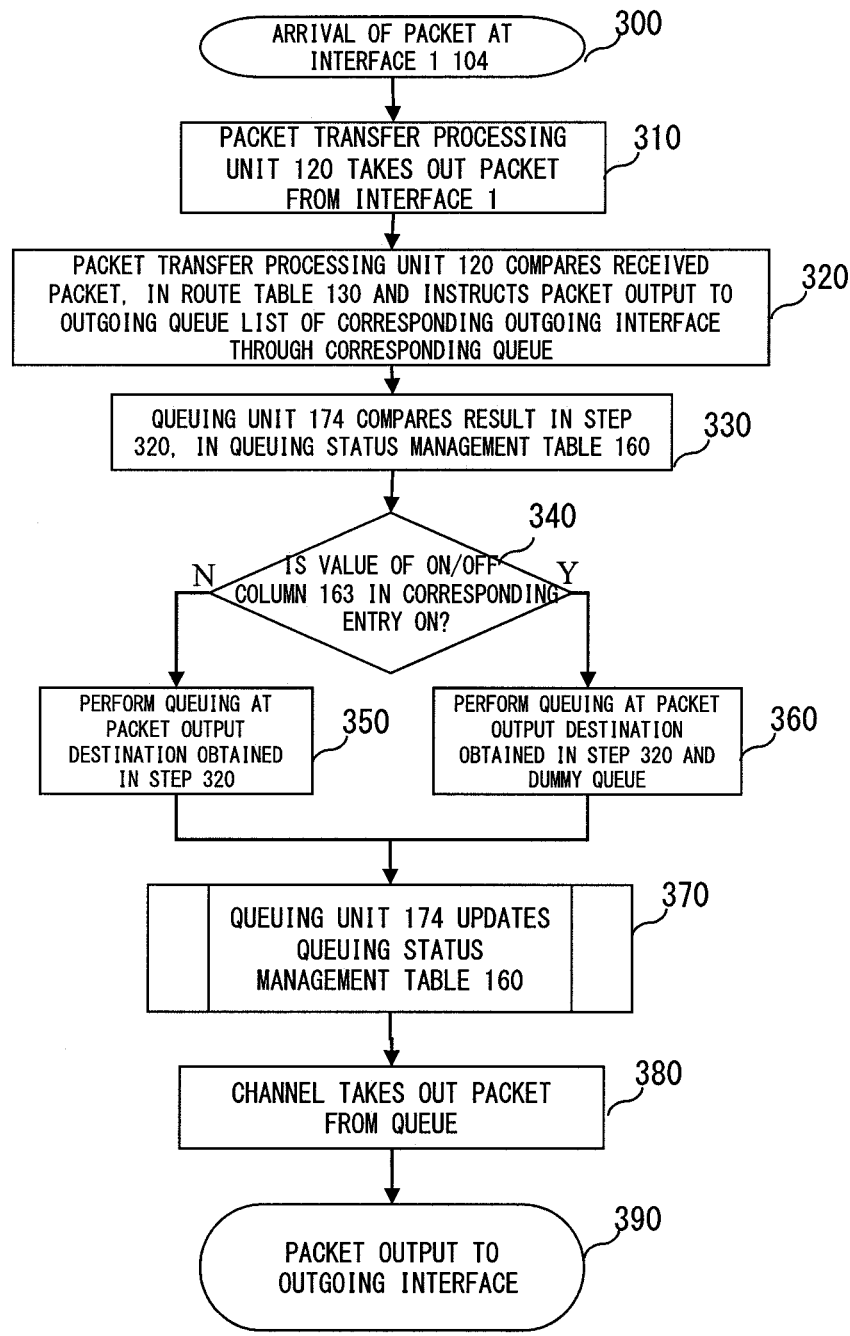
FIG. 7 is a flowchart illustrating a procedure for relaying packets in the apparatus shown in FIGS. 6A and 6B.

FIG. 7 is a flowchart illustrating a procedure for relaying packets in the packet relay apparatus shown in FIGS. 6A and 6B.

When a packet comes from an interface, the packet transfer processing unit 120 takes out the packet from the interface (step 310). The packet transfer processing unit 120 compares the destination of the packet with the destination 131 in the route table 130, determines an outgoing queue list corresponding to the interface of the packet from the outgoing interface 132 of the entry where the destinations match, and gives the outgoing queue list a command to output the packet to the outgoing queue 133 of the entry (step 320).

The queuing unit 174 of the outgoing queue list receiving the command compares the outgoing queue 133 of the packet determined in step 320, in the outgoing queue status management table 160 and checks the value of the copy on/off flag 162 in the entry where the outgoing queue 131 matches the outgoing queue 161. If the value is OFF, the queuing unit 174 outputs a copied packet to the outgoing queue of the outgoing interface, determined in step 320 (step 350). If the value is ON, the packet is output to the dummy queue 175 in the outgoing queue list of the outgoing interface, determined in step 320 as well (step 360).

The queuing unit 174 updates the queuing status management table 160 (step 370), as described later. The outgoing queue list 171, 172, or 173 selects an appropriate queue by the output selector 178, and the corresponding interface 104, 105, or 106 takes out the packet from the queue and outputs the packet (steps 380 and 390).

Figure 8:
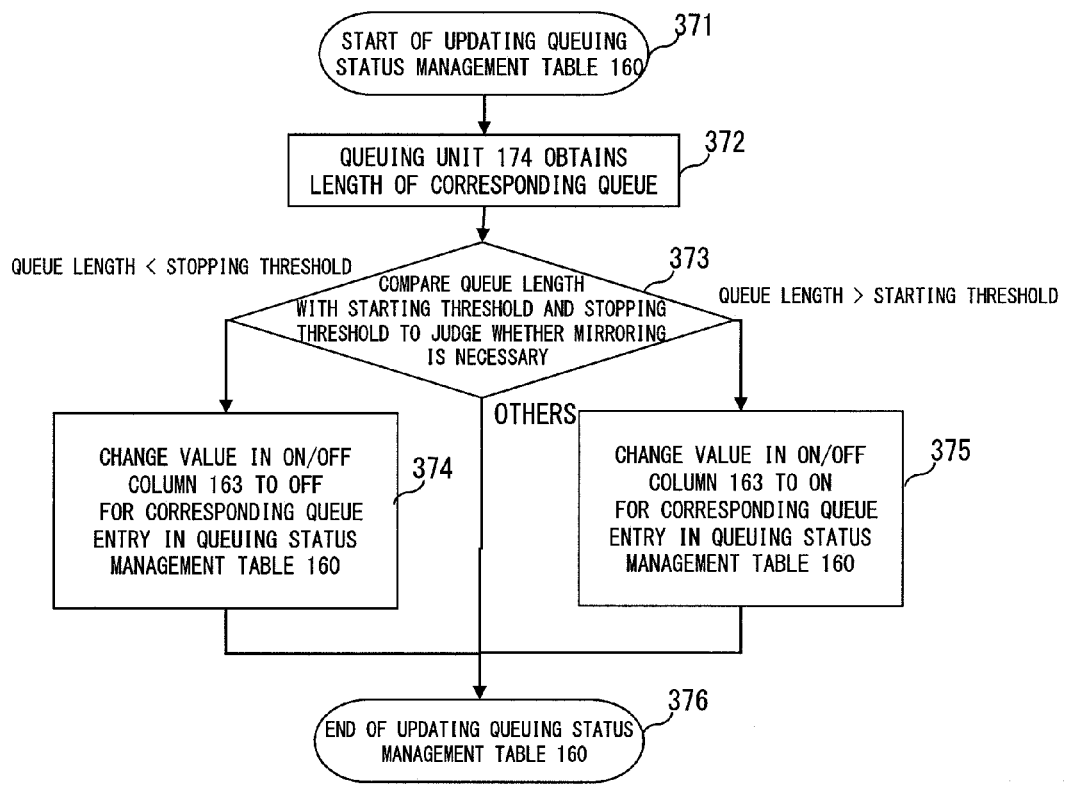
FIG. 8 is a flowchart illustrating a procedure for updating a queuing status management table.

FIG. 8 is a flowchart illustrating a procedure for updating the queuing status management table 160. With reference to FIG. 8, step 370 for updating the queuing status management table 160 will be described.

The queuing unit 174 outputs or copies the packet to the queue (176 or 177) in the outgoing queue list and checks the length of the queue (step 372). Then, the length is compared with a mirroring starting threshold and a mirroring stopping threshold, in order to determine whether mirroring is necessary (step 373). The mirroring starting threshold and the mirroring stopping threshold may be stored beforehand in an internal or external memory of the queuing unit 174, and the queuing unit 174 may be configured to reference the values. As in the first embodiment, the mirroring starting threshold should be greater than the mirroring stopping threshold.

If the queue length is greater than the mirroring starting threshold, the queuing unit 174 changes the value of the copy on/off flag 162 in the corresponding queue entry of the queuing status management table 160 to ON (step 375). If the queue length is smaller than the mirroring stopping threshold, the queuing unit 174 changes the value of the flag to OFF (step 374). Otherwise (the queue length is smaller than or equal to the mirroring starting threshold and greater than or equal to the mirroring stopping threshold) in step 273, the queuing unit 174 goes to step 276 without changing the queuing status management table 160.

Accordingly, the packets output to the queue is copied to the dummy queue as well after the queue length exceeds the mirroring starting threshold until the queue length becomes smaller than the mirroring stopping threshold. Unlike the first embodiment, a single packet relay apparatus can take out a packet that is almost overflowing from a queue, without using an external server.

The packet relay apparatus described in this embodiment is provided by software. This does not deny any equivalent invention with a hardware packet relay apparatus.

The outgoing queue management unit 150 checks the overflow of the outgoing queue in this embodiment and can also check the overflow of an incoming queue or a Policer buffer in the same manner. To be more specific, a part that manages the amount of usage of the incoming queue or the Policer buffer in the packet relay apparatus 100 should execute the same queue length monitoring operation as that performed by the outgoing queue management unit 150 in this embodiment.

2-9. Ninth Embodiment

The applications as described in the second, third, fifth, sixth, and seventh embodiments are possible in this embodiment.

In the second and third embodiments, steps 240 to 260 in FIG. 5 performed by the packet relay apparatus (1) correspond to steps 340 to 360 in FIG. 7 performed by the packet relay apparatus (2). The corresponding descriptions should be read accordingly.

In the fifth to seventh embodiments, steps 230 to 270 in FIG. 5 and steps 273 to 275 in FIG. 1 performed by the packet relay apparatus (1) correspond to steps 330 to 370 in FIG. 7 and steps 373 to 375 in FIG. 8 performed by with respect to the packet relay apparatus (2). The corresponding descriptions should be read accordingly. The outgoing queue management unit 150 and the mirroring management table 140 in the packet relay apparatus (1) may also be read respectively as the queuing unit 174 and the queuing status management table 160 in the packet relay apparatus (2) in the descriptions.

As in the fourth embodiment, the ninth embodiment can also be realized by using an external server.

In step 360, when copying a packet into the dummy queue, the queuing unit 174 may not copy the entire packet but the header of the packet alone. This can save the dummy queue and can take a greater amount of information of a flow causing a queue overflow.

When copying a packet into the dummy queue in step 360, the queuing unit 174 may add information indicating the transfer status in the apparatus (such as a passed queue, the queue length, and the input/output interface) to the actually input/output packet. This allows detailed information that cannot be judged just by analyzing the packet by an external traffic analyzer to be taken together with the packet. With the information, the cause of a queue overflow can be found out more easily.

What is claimed is:

1. A packet relay apparatus comprising:
a packet transfer processing unit that manages packet transfer processing;
an outgoing queue list for each interface, the list having a plurality of queues, selecting a queue from the plurality of queues, and outputting a packet from the queue to an interface;
an outgoing queue management unit that controls the outgoing queue list;
a route table that stores an outgoing interface and an outgoing queue corresponding to a destination; and
a mirroring management table that stores a mirroring destination interface and a mirroring flag corresponding to the outgoing interface and outgoing queue;
the packet transfer processing unit comparing the destination of a received packet with a destination in the route table and obtaining the outgoing interface and outgoing queue of an entry where the destinations match as the outgoing interface and the outgoing queue of the packet;
the packet transfer processing unit comparing the obtained outgoing interface and outgoing queue, in the mirroring management table;
if the mirroring flag of an entry where the outgoing interface and outgoing queue match is valid, the packet transfer processing unit instructing the outgoing queue management unit to copy the packet to the destination interface in the entry, and the outgoing queue management unit outputting the packet to the queue in the outgoing queue list, corresponding to the outgoing interface, and outputting a copied packet to the queue in the outgoing queue list, corresponding to the mirroring destination interface;

if the mirroring flag of the corresponding entry is invalid, the packet transfer processing unit instructing the outgoing queue management unit to output the packet, and the outgoing queue management unit outputting the packet to the queue in the outgoing queue list, corresponding to the outgoing interface;

the outgoing queue management unit obtaining the length of the queue from which the packet is output, if the queue length is greater than a predetermined mirroring starting threshold, changing the mirroring flag in the corresponding entry of the mirroring management table to valid, or, if the queue length is smaller than a predetermined mirroring stopping threshold, changing the flag to invalid; and the outgoing queue list selecting the queue from the plurality of queues and outputting the packet to the corresponding interface;

wherein:

the mirroring management table further includes information of an interval and a skipped packet for each entry;

the packet transfer unit increments the value of the skipped packet in the corresponding entry of the mirroring management table, before performing mirroring where the mirroring flag is valid, performs mirroring if the value of the skipped packet becomes greater than or equal to the value of the interval, and does not perform mirroring if the value of the skipped packet is smaller than the value of the interval;

and when the mirroring management table is updated, the outgoing queue management unit updates the mirroring flag and the interval if the length of the corresponding queue is not smaller than the stopping threshold.

2. A packet relay apparatus comprising:

a packet transfer processing unit that manages packet transfer processing;

an outgoing queue list for each interface, the list having a plurality of queues, selecting an appropriate queue from the plurality of queues, and outputting a packet from the queue to an interface; and a route table that stores an outgoing interface and an outgoing queue corresponding to a destination;

the outgoing queue list further comprising:

a mirroring management table that stores a mirroring flag corresponding to the outgoing queue;

a dummy queue that is not used to output a packet; and an outgoing queue management unit that outputs the packet received from the packet transfer processing unit to either the plurality of queues or the dummy queue;

the packet transfer processing unit comparing the destination of the received packet with a destination in the route table, determining the outgoing queue list of the packet from the destination interface of an entry where the destinations match, and instructing the outgoing queue list to output the packet to the outgoing queue of the entry;

the outgoing queue management unit of the instructed outgoing queue list comparing the outgoing queue, in the mirroring management table, if the mirroring flag of an entry where the outgoing queue matches is invalid, outputting the packet to the outgoing queue of the determined outgoing interface, and if the flag is valid, outputting the packet to the dummy queue in the outgoing queue list of the determined outgoing interface, in addition to the outgoing queue;

the outgoing queue management unit obtaining the length of the queue from which the packet is output, if the queue length is greater than a predetermined mirroring starting threshold, changing the mirroring flag in the corresponding queue entry of the mirroring management table to valid, and if the queue length is smaller than a predetermined mirroring stopping threshold, changing the flag to invalid; and the outgoing queue list selecting the queue from the plurality of queues and outputting the packet to the corresponding interface;

wherein:

the mirroring management table further includes information of an interval and a skipped packet for each entry;

the packet transfer unit increments the value of the skipped packet in the corresponding entry of the mirroring management table, before performing mirroring where the mirroring flag is valid, performs mirroring if the value of the skipped packet becomes greater than or equal to the value of the interval, and does not perform mirroring if the value of the skipped packet is smaller than the value of the interval; and when the mirroring management table is updated, the outgoing queue management unit updates the mirroring flag and the interval if the length of the corresponding queue is not smaller than the stopping threshold.

3. A packet relay apparatus according to claim 1, further comprising a filtering database that stores an action of permission or denial, correspondingly to a content of the header of the packet;

wherein the packet transfer processing unit compares the content of the header of the packet with a condition stored in the filtering database, before mirroring the packet where the mirroring flag is valid, performs mirroring if the action of an entry where the content matches is permission, and does not perform mirroring if the action is denial or if there is no entry where the content matches.

4. A packet relay apparatus according to claim 1, further comprising an external server that has a function to monitor the queue length of each queue in the outgoing queue list and a function to issue a mirroring instruction;

wherein the external server monitors the length of each queue in a plurality of outgoing queue lists and determines whether the packet should be mirrored in accordance with the queue length.

5. A packet relay apparatus according to claim 1, further comprising an external server that has a function to monitor the length of each queue in the outgoing queue list and a function to issue a mirroring instruction;

wherein the external server periodically inquires about the length of each outgoing queue in a plurality of outgoing queue lists at the outgoing queue management unit, and if a queue length reaching a predetermined threshold is detected, instructs the packet relay apparatus to update the mirroring management table.

6. A packet relay apparatus according to one of claim 1, wherein the mirroring management table further includes either or both of a mirroring starting threshold or a mirroring stopping threshold in each entry; and the outgoing queue management unit uses either or both of the corresponding mirroring starting threshold or the mirroring stopping threshold when judging whether to start or stop mirroring.

7. A packet relay apparatus according to claim 1, wherein if it can be determined which of any two queues is more likely to output a packet because of the characteristics of a scheduling algorithm by which an output selector in the outgoing queue list selects a queue for packet output, the outgoing queue management unit sets the mirroring flag of one outgoing queue to valid and starts mirroring, and then sets to valid the mirroring flag of another queue which is less likely to output a packet because of the characteristics of the scheduling algorithm and starts mirroring.

8. A packet relay apparatus according to claim 1, wherein the mirroring management table further includes update information indicating the time when mirroring starts or stops most recently in each entry;
   the outgoing queue management unit stores the mirroring start time as the update information each time mirroring starts; and
   the outgoing queue management unit checks the update information in the mirroring management table periodically and raises the mirroring starting threshold or mirroring stopping threshold in an entry which has not entered a mirroring start state for a predetermined period of time.

9. A packet relay apparatus according to claim 2, wherein the outgoing queue list copies just the header of a packet to the dummy queue.

10. A packet relay apparatus according to claim 2, wherein when copying a packet to the dummy queue, the outgoing queue list adds information on transfer within the apparatus, which is not given in a packet and which includes one or more of the queue which the packet has passed through, the queue length, and the input or output interface.

11. A packet relay apparatus according to claim 2, further comprising a filtering database that stores an action of permission or denial, correspondingly to a content of the header of the packet;
   wherein the packet transfer processing unit compares the content of the header of the packet with a condition stored in the filtering database, before mirroring the packet where the mirroring flag is valid, performs mirroring if the action of an entry where the content matches is permission, and does not perform mirroring if the action is denial or if there is no entry where the content matches.

12. A packet relay apparatus according to claim 2, further comprising an external server that has a function to monitor the queue length of each queue in the outgoing queue list and a function to issue a mirroring instruction;
   wherein the external server monitors the length of each queue in a plurality of outgoing queue lists and determines whether the packet should be mirrored in accordance with the queue length.

13. A packet relay apparatus according to claim 2, further comprising an external server that has a function to monitor the length of each queue in the outgoing queue list and a function to issue a mirroring instruction;
   wherein the external server periodically inquires about the length of each outgoing queue in a plurality of outgoing queue lists at the outgoing queue management unit, and if a queue length reaching a predetermined threshold is detected, instructs the packet relay apparatus to update the mirroring management table.

14. A packet relay apparatus according to one of claim 2, wherein the mirroring management table further includes either or both of a mirroring starting threshold or a mirroring stopping threshold in each entry; and the outgoing queue management unit uses either or both of the corresponding mirroring starting threshold or the mirroring stopping threshold when judging whether to start or stop mirroring.

15. A packet relay apparatus according to claim 2, wherein if it can be determined which of any two queues is more likely to output a packet because of the characteristics of a scheduling algorithm by which an output selector in the outgoing queue list selects a queue for packet output, the outgoing queue management unit sets the mirroring flag of one outgoing queue to valid and starts mirroring, and then sets to valid the mirroring flag of another queue which is less likely to output a packet because of the characteristics of the scheduling algorithm and starts mirroring.

16. A packet relay apparatus according to claim 2, wherein the mirroring management table further includes update information indicating the time when mirroring starts or stops most recently in each entry;
   the outgoing queue management unit stores the mirroring start time as the update information each time mirroring starts; and
   the outgoing queue management unit checks the update information in the mirroring management table periodically and raises the mirroring starting threshold or mirroring stopping threshold in an entry which has not entered a mirroring start state for a predetermined period of time.

* * * * *